(12) United States Patent
Allen

(10) Patent No.: US 8,398,332 B2
(45) Date of Patent: Mar. 19, 2013

(54) GROUND-REINFORCING GRID

(75) Inventor: Philip Marshall Allen, Walton (GB)

(73) Assignee: Fiberweb, Inc., Old Hickory, TN (US)

( * ) Notice: Subject to any disclaimer, the term of this patent is extended or adjusted under 35 U.S.C. 154(b) by 0 days.

(21) Appl. No.: 13/320,355

(22) PCT Filed: Apr. 23, 2010

(86) PCT No.: PCT/GB2010/000813
§ 371 (c)(1),
(2), (4) Date: Nov. 14, 2011

(87) PCT Pub. No.: WO2010/130968
PCT Pub. Date: Nov. 18, 2010

(65) Prior Publication Data
US 2012/0057932 A1 Mar. 8, 2012

(30) Foreign Application Priority Data

May 12, 2009 (GB) .................................. 0908147.2

(51) Int. Cl.
*E01C 7/36* (2006.01)
(52) U.S. Cl. ........................................ 404/70; 405/302.4
(58) Field of Classification Search ............... 405/302.4, 405/302.6; 404/28, 70, 71
See application file for complete search history.

(56) References Cited

U.S. PATENT DOCUMENTS

| 1,765,652 A | * | 6/1930 | Burgess ......................... 404/21 |
| 2,899,775 A | | 8/1959 | Partin |
| 3,125,196 A | * | 3/1964 | Fenner .......................... 52/656.7 |
| 4,111,585 A | | 9/1978 | Mascaro |
| 4,118,892 A | * | 10/1978 | Nakamura et al. ............. 47/65.9 |
| 5,428,935 A | * | 7/1995 | Mitchell .......................... 52/698 |
| 6,428,870 B1 | * | 8/2002 | Bohnhoff ......................... 428/44 |
| 6,450,731 B1 | * | 9/2002 | Bohnhoff ......................... 405/37 |
| 6,451,400 B1 | * | 9/2002 | Brock et al. .................... 428/44 |

(Continued)

FOREIGN PATENT DOCUMENTS

| AR | 230463 | 4/1984 |
| DE | 19718353 | 11/1998 |

(Continued)

OTHER PUBLICATIONS

Certificate of Registration No. 001906306-0001 by the Office for Harmonization in the Internal Market—Trademark and Designs, registered on Aug. 19, 2011.

(Continued)

*Primary Examiner* — Gary S Hartmann
(74) *Attorney, Agent, or Firm* — Meunier Carlin & Curfman, LLC

(57) ABSTRACT

Disclosed herein are ground-reinforcing grids comprising a plurality of modular units, wherein each modular unit comprises: a plurality of cells, rib members connecting the cells together such that the cells are spaced apart from each other by the rib members, and connector means for connecting the modular units together, wherein the cells are configured to flex more than the rib members; wherein each modular unit has sufficient rigidity to enable the ground-reinforcing grid to provide ground reinforcement; and wherein each modular unit has sufficient flexibility provided by the flexing of the plurality of cells to enable the ground-reinforcing grid to flex and accommodate loads without adversely affecting the rigidity of the ground-reinforcing grid.

19 Claims, 5 Drawing Sheets

U.S. PATENT DOCUMENTS

| | | | | |
|---|---|---|---|---|
| 7,108,454 B2 * | 9/2006 | Blackwood | | 405/36 |
| 7,144,609 B2 * | 12/2006 | Reddick | | 428/17 |
| D571,024 S * | 6/2008 | Lee | | D25/199 |
| 8,128,311 B2 * | 3/2012 | Son et al. | | 404/36 |
| 2003/0089051 A1 * | 5/2003 | Bertolini | | 52/177 |

FOREIGN PATENT DOCUMENTS

| | | |
|---|---|---|
| JP | 52074626 | 6/1977 |
| JP | 52149537 | 11/1977 |
| JP | 59006463 | 1/1984 |
| WO | WO 99/41460 | 8/1999 |
| WO | WO 2006/100705 | 9/2006 |

OTHER PUBLICATIONS

English-language abstract of DE 19718353.

Search Report in Application No. GB1006851.8, dated Aug. 20, 2010.

International Search Report for PCT/GB2010/000813, mailed Aug. 4, 2010.

Written Opinion of the International Searching Authority for PCT/GB2010/000813, mailed Aug. 4, 2010.

* cited by examiner

GROUND-REINFORCING GRID

This application is the U.S. national phase of International Application No. PCT/GB2010/000813, filed 23 Apr. 2010, which designated the U.S. and claims priority to GB Application No. 0908147.2, filed 12 May 2009, the entire contents of each of which are hereby incorporated by reference.

BACKGROUND

This invention relates to a ground-reinforcing grid.

Ground-reinforcing grids are known. They may be used for grass-reinforcing situations where pedestrian and/or vehicular traffic would wear away grass without the presence of the ground-reinforcing grid. They are also used in gravel retention situations where pedestrian and/or vehicular traffic would otherwise cause the gravel to migrate beyond its designated area. The ground-reinforcing grids may be used for reinforcing various types of ground in a wide variety of situations including temporary car parks, sports areas, caravan and holiday park areas, and equestrian areas.

Ever increasing applications for the ground-reinforcing grids together with ever increasing expectations of good protection from the ground-reinforcing grids have led to demands for more and more sophisticated designs of ground-reinforcing grids. Often the known sophisticated designs provide advantages at the expense of the basic rigidity required by the ground-reinforcing grids. The result is that the ground-reinforcing grids may be too flexible in some circumstances and thus may not adequately perform their primary purpose of ground reinforcement.

It is an aim of the present invention to reduce the above mentioned problem.

SUMMARY

Accordingly, in one non-limiting embodiment of the present invention there is provided a ground-reinforcing grid in which:

(i) the ground-reinforcing grid comprises a plurality of modular units;

(ii) each modular unit comprises a plurality of cells, rib members which connect the cells together such that the cells are spaced apart from each other by the rib members, and connector means for connecting the modular units together;

(iii) each modular unit has rigidity to enable the ground-reinforcing grid to provide the ground reinforcement;

(iv) each modular unit has flexibility to enable the ground-reinforcing grid to flex and accommodate loads when in use on ground that provides less than an optimal base for the ground-reinforcing grid; and (v) the flexibility is provided by flexing of the cells and not flexing of the rib members whereby the flexibility is a limited flexibility that does not adversely affect the rigidity of the ground-reinforcing grid that is required for the ground reinforcement.

The ground-reinforcing grid of the present invention is advantageous in that the ribs provide much of the rigidity required by the modular unit. The basic construction of the cells provides the remainder of the required rigidity. In addition, the basic construction of cells is such that the cells enable limited flexing of the modular unit such that the modular unit is able to flex to enable the ground-reinforcing grid to accommodate loads when in use on ground that provides less than the optimal base for the ground-reinforcing grid, for example ground which is too soft as may be the case with sand, or ground which has a local area of subsidence as might be caused by flood water. The loads that need to be accommodated may be those from heavy pedestrian traffic or vehicular traffic including cars, vans, lorries and coaches.

The ground-reinforcing grid may be one in which the cells inside the peripheral cells in each modular unit are such that each cell has four of the rib members. More or less than four of the rib members may be employed. When four of the rib members are employed, then preferably the four rib members are equidistantly spaced around their cell. Other spacings for the four rib members may be employed.

Preferably, the cells are circular in plan. Other shapes for the cells may be employed so that, for example, the cells may be octagonal in plan.

The rib members are preferably walls which extend transversely of the ground-reinforcing grid. Other types of rib members may be employed. The walls may be solid walls or apertured walls.

The cells may include container portions for aiding water retention to help to stop grass in the cells from drying out during drought conditions.

The container portions may be such that each container portion has at least one aperture for draining away excess water. This helps to avoid the grass roots being subjected to too much water in wet conditions. The said at least one aperture may also provide an aperture which helps to provide a mechanical interlock for grass roots and/or gravel forming part of the ground needing to be retained. Air movement in the ground may also be helped.

The connector means may comprise two-part cells which fit together vertically to make a complete cell. Preferably, each part-cell is one half of a complete cell. Also preferably, the lower one of each part-cell forms a full D-loop. This facilitates the reduction of lateral movement during use of the ground-reinforcing grid because the full D-loop forms part of the complete circumference of its peripheral cell.

The connector means may also comprise auxiliary retention means for use in helping to retain the modular units together when they are subjected in use to vertical loads from vehicles driving over the ground-reinforcing grid.

The auxiliary retention means are preferably snap fit clips which clip adjacent walls of the cells together. This stops vertical disconnection of adjacent cells. Other types of auxiliary retention means may be employed.

The ground-reinforcing grid may include integral ground-engaging spikes. The ground-engaging spikes may provide lateral stabilisation, for example for helping to stop lateral movement as may occur when the ground-reinforcing grid is driven over by vehicles. The ground-engaging spikes may also provide vertical stabilisation, for example by stopping the ground-reinforcing grid sinking too far into soft ground or a bedding layer, with the ground-engaging spikes being able to extend through the soft ground or the bedding layer and rest on firmer lower ground or a base construction.

The ground-reinforcing grid may be 85 mm in thickness, with the cells being 50 mm deep and the spikes being 35 mm long. Other thicknesses for the ground-reinforcing grid may be employed.

Each modular unit may be 500 mm by 500 mm. Other sizes and shapes for the modular units may be employed.

Each modular unit may comprise six×six rows of full cells (i.e. 36 full cells) and two half cells in each row of six full cells, the half cells forming part of the connector means for connecting the modular units together. With such a construction, the connected modular units each have seven full cells. Other numbers of cells for the modular units may be employed.

The cells may be such that they have tops with castellations. The gaps in the castellations may form fixing locations, for example for U-pin connectors for fixing the modular units onto slopes or onto surfaces prone to flooding. The gaps in the castallations may also provide grip locations for pedestrians and vehicles, and allowing grass to grow through the castellations to help connect the modular units together and aid the sustainability of healthy growth when modular units are trafficked.

The modular units may be such that they are able to overlap each other by at least one cell in any direction. Other constructions may be employed. If the modular units are able to overlap each other by at least one cell in any direction, then the modular units are able to be moved in increments of complete cells. There is no need to cut out parts of the ground-reinforcing grid as occurs with known ground-reinforcing grids.

Preferably, the ground-reinforcing grid is made of a polyethylene copolymer. Other materials may be employed so that, for example, the ground-reinforcing grid may be made of a polypropylene copolymer. The polypropylene copolymer may be cheaper than the polyethylene copolymer but the polypropylene copolymer may tend to fracture in very cold weather. Other types of plastics materials may be employed. Preferably, the plastics material are recycled plastics materials, for example 100% recycled plastics materials. The ground-reinforcing grid will usually be formed by injection moulding the plastics materials.

BRIEF DESCRIPTION OF THE DRAWINGS

An embodiment of the invention will now be described solely by way of example and with reference to the accompanying drawings in which.

DETAILED DESCRIPTION

Figure 1:
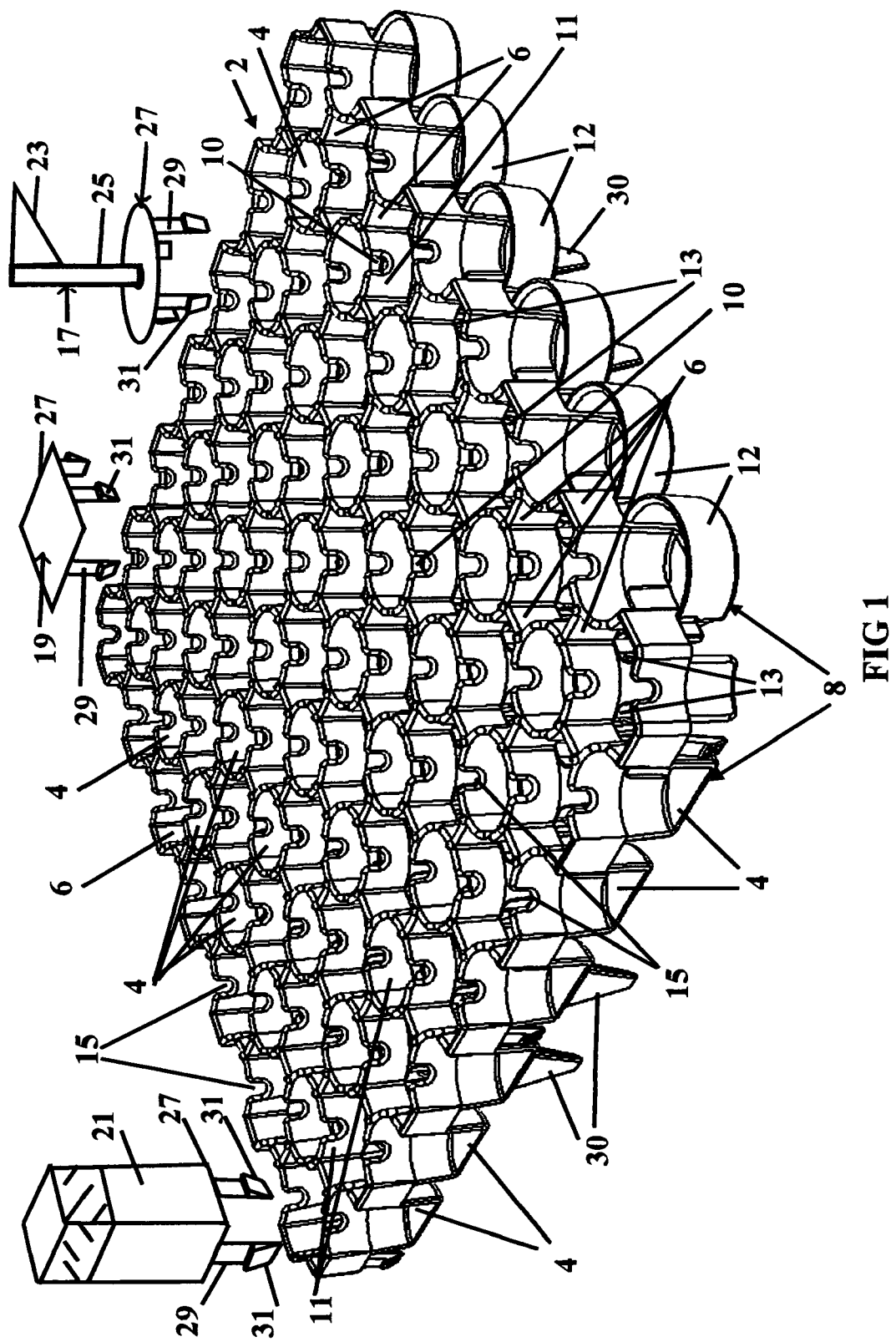
FIG. 1 is a perspective view from above of a modular unit forming part of a ground-reinforcing grid of the present invention.

Referring to FIGS. 1-4, there is shown a ground-reinforcing grid comprising a plurality of modular units, one of which is shown as modular unit 2. The modular unit 2 comprises a plurality of cells 4 and rib members 6 which connect the cells 4 together such that the cells 4 are spaced apart from each other by the rib members 6. The modular unit 2 also comprises connector means 8 for connecting a plurality of modular units 2 together to form the ground-reinforcing grid.

The modular unit 2 has the rigidity for enabling the ground-reinforcing grid to provide the ground reinforcement. The modular unit 2 also has the flexibility to enable the ground-reinforcing grid to flex and accommodate loads when in use on ground that provides less than an optimal base for the ground-reinforcing grid. The flexibility is provided by flexing of the cells 4 and not flexing of the rib members 6. Thus the flexibility is a limited flexibility that does not adversely affect the rigidity of the ground-reinforcing grid that is required for the ground reinforcement.

The inner cells 4 which are inside the peripheral cells 4 in the modular unit 2 are each such that each cell 4 has four of the rib members 6. The four rib members 6 are equidistantly spaced around their cell 4. The cells 4 are circular in plan. The rib members 6 are walls which extend transversely of the ground-reinforcing grid.

As best appreciated from FIG. 1, the connector means 8 comprise two-part cells 4 which fit together vertically to make a complete cell 4. Each part-cell 4 is one half of a complete cell 4. The lower one of each part-cell 4 has a full D-loop 12, thereby to facilitate reduction of lateral movement in use of the ground-reinforcing grid after installation. This is because the D-loop 12 is of the same diameter as a completed cell 4 and thus the D-loop 12 is able to press up against a border retaining wall (not shown) without any lateral movement of the ground-reinforcing grid after installation and during use.

Each cell 4 is an open-walled structure having a container portion 10 defined by a circular wall 11. The circular wall 11 has apertures 13 at its bottom, and slots 15 at its top. There are four of the apertures 13 and four of the slots 15. The slots 15 cause the top of the container portion 10 to have a castellated appearance.

The open-walled structure of the container portion 10 enables the following advantages.

(i) It enables unrestricted lateral and vertical root growth between the container portions 10 and also between the modular units 2. This aid in providing a mechanical interlock of the modular units 2. It also sustains wear tolerance and durability of grass or other vegetation growing through the modular units 2.

(ii) It enables unrestricted water flow, gas and nutrient exchange within retained soils or retained aggregates.

(iii) It enables the secure clipping and locking-in of associated specifically designed sundry items such for example as parking bay markers, aisle markers, disabled markers, posts, lights, speed ramps and curbs. These sundry items are able to clip into the container portions 10. Examples of the sundry items are shown in FIG. 1 as a flag 17, a marker 19 and a post reflector 21. The flag 17 comprises a flag portion 23 on a post 25. The post 25 terminates in a connector portion 27 having legs 29 with heads 31 which clip into the apertures 13 and therefore underneath the wall 11 of the container portion 10. The marker 19 and the post reflector 21 each has a similar connector portion 27 with the legs 29 and the heads 31 which clip into the apertures 13.

The connector means 8 also comprises auxiliary retention means 14 for use in helping to retain the modular units when they are in use and they are subjected to vertical loads from vehicles travelling over the ground-reinforcing grid. The auxiliary retention means 14 are snap-fit clips which clip adjacent walls of the cells 4 together. This stops vertical disconnection of the modular units 2 from each other.

The modular unit 2 shown in FIGS. 1-4 includes integral ground-engaging spikes 30. The spikes 30 provide lateral stabilisation, for example in helping to stop lateral movement of the ground-reinforcing grid as might occur when vehicles travel over the ground-reinforcing grid. The spikes 30 also provide vertical stabilisation, for example in helping to stop the ground-reinforcing grid getting pushed down into soft ground, for example getting pushed down into a bedding layer of sand and/or gravel. The spikes 30 are able to extend through the soft ground and rest on harder ground therebelow.

The ground-reinforcing grid and the modular units 2 may be made to any suitable and desired thickness. A presently preferred thickness is 85 mm, with the cells 4 being 50 mm deep and the spikes 30 being 35 mm deep. Also preferably, each modular unit 2 is 500 mm by 500 mm but other sizes for the modular units 2 may be employed, and the modular units can be other than square if desired.

Preferably, each modular unit comprises six×six rows of full cells 4 (i.e. 36 full cells 4) and two half cells 4 in each row of six full cells 4. The two half cells 4 form part of the connector means 8 for connecting the modular units 2 together. When the modular units 2 are connected together, then each modular unit has seven full cells. Modular units having more or less than seven full cells may be employed.

Figure 2:
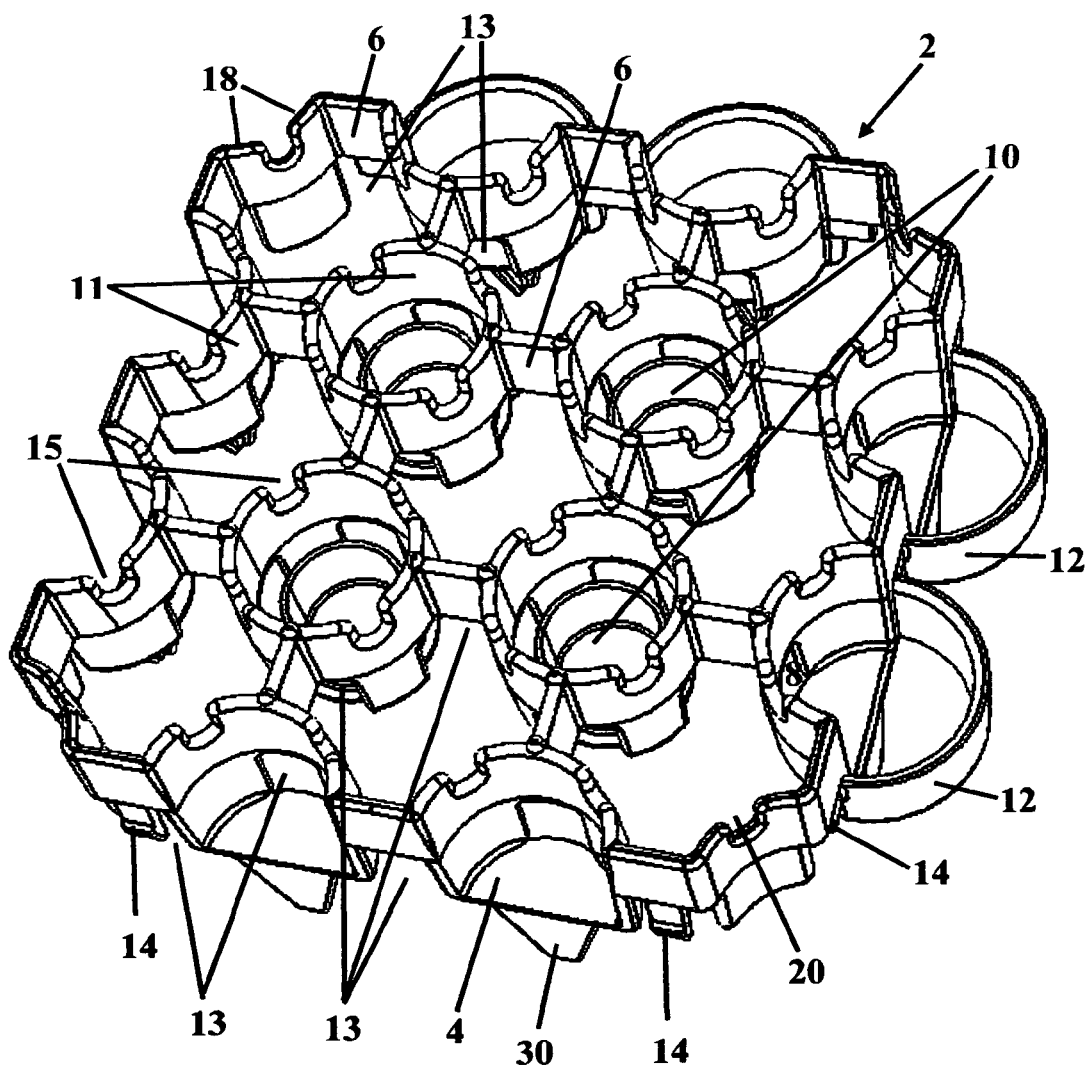
FIG. 2 is an enlarged perspective view from above of the modular unit shown in FIG. 1.
Figure 3:
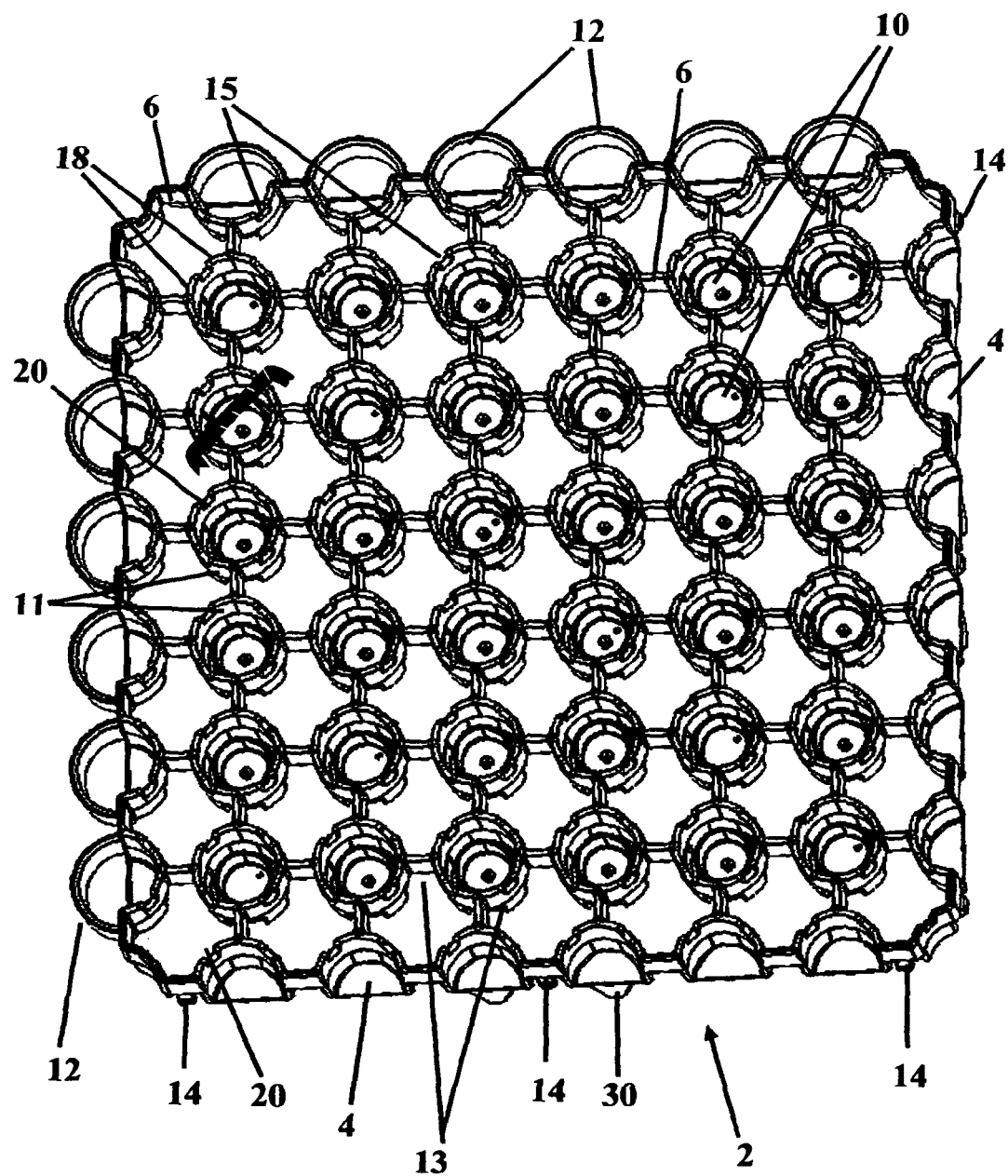
FIG. 3 is a top view of the modular unit shown in FIG. 1.
Figure 4:
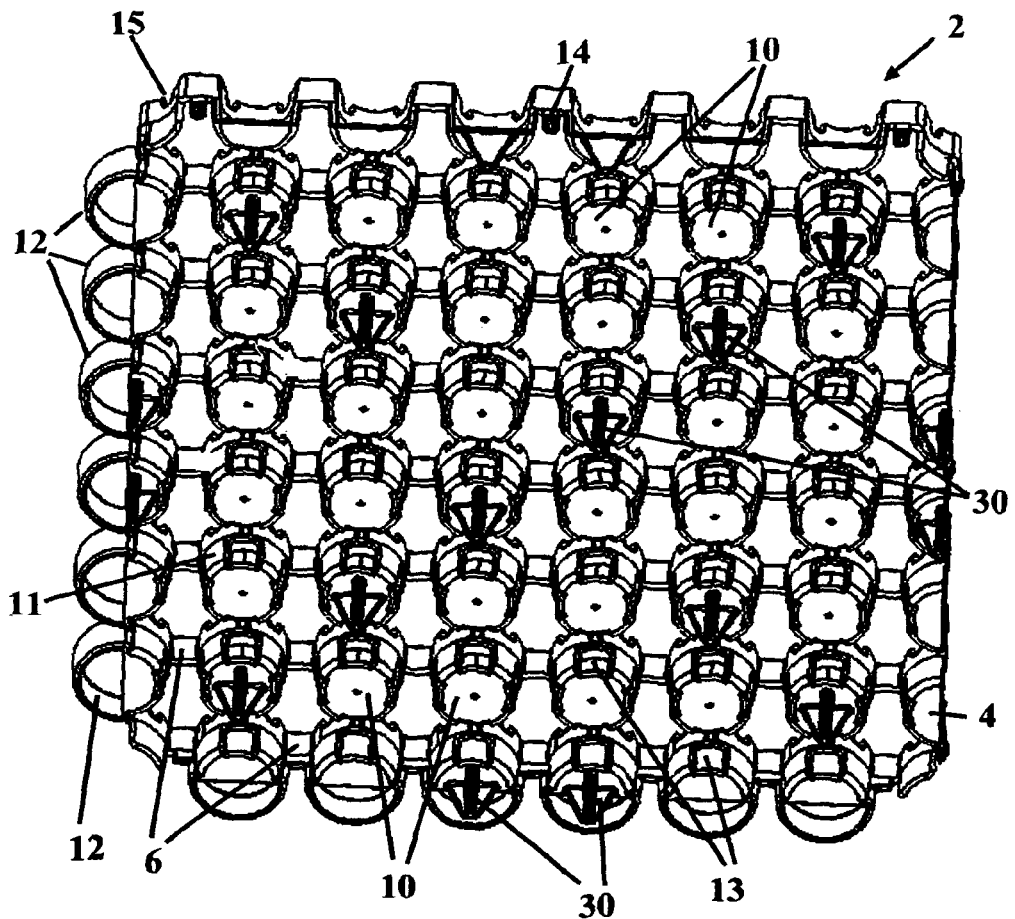
FIG. 4 is an underneath view of the modular unit shown in FIG. 1.
Figures 5, 6:
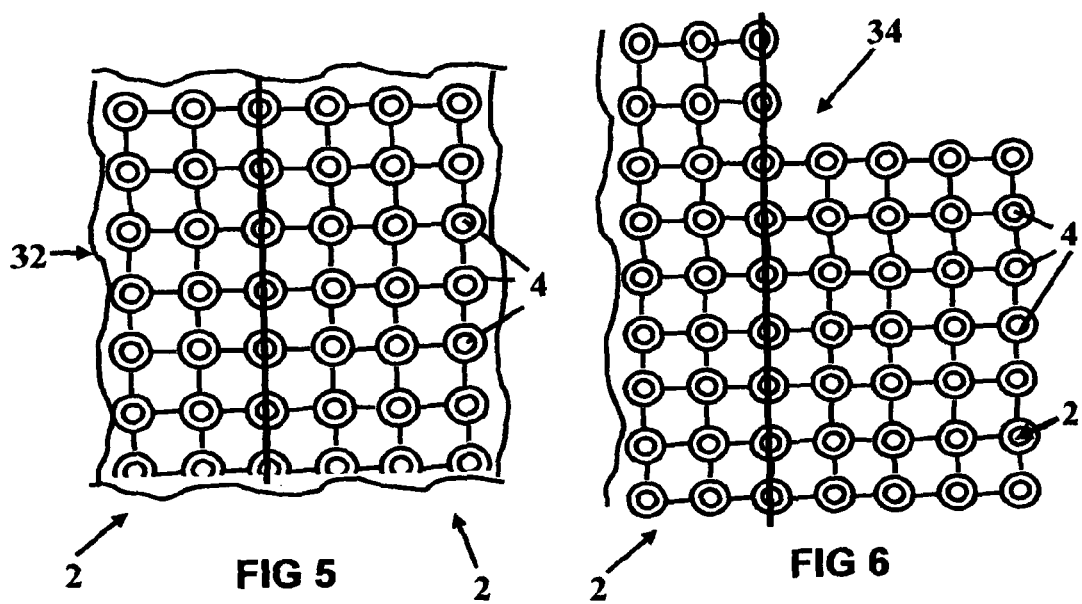
FIG. 5 shows how two of the modular units shown in FIG. 1 are able to be connected together in line.
FIG. 6 shows how two of the modular units shown in FIG. 1 are able to be connected together such that the modular units are incrementally offset.

The modular unit 2 shown in FIGS. 1 and 2 is easily able to be connected together using the connector means. The connected modular units 2 can be separated if desired. Each modular unit 2 is able to be connected squarely and in line with neighbouring modular units 2, this being as shown in FIG. 5 to form part of a ground-reinforcing grid 32. Alternatively, if desired, the modular units 2 may be connected together such that they are off-set by increments of one or more cells, for example as shown in FIG. 6 to form a ground-reinforcing grid 34. The offsetting of the modular cells 2 is still able to retain the locking snap-fit capability afforded by the auxiliary retention means 14. Thus even when the modular units 2 are offset, the auxiliary retention means 14 is still able to help resist any vertical displacement. The auxiliary retention means 14 acts together with the spikes 16 as regards helping to facilitate vertical displacement of the modular units 4 with respect to each other during use of the ground-reinforcing grid.

Figure 7:
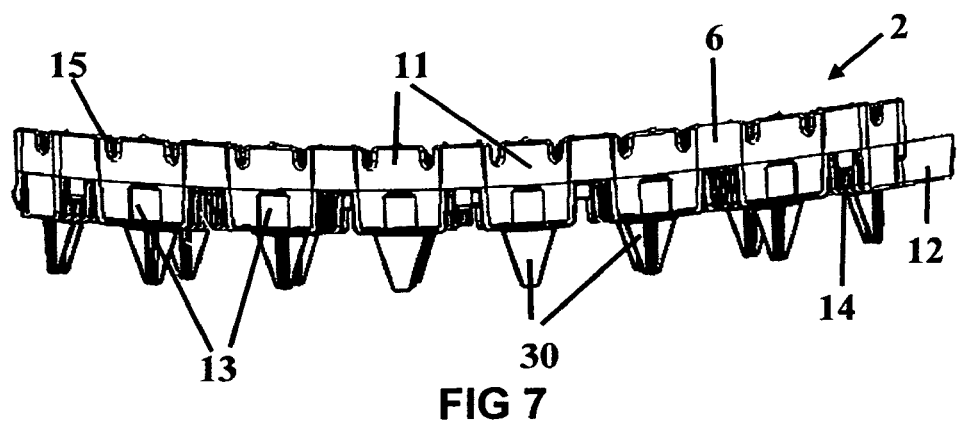
FIG. 7 is a front elevation showing how the modular unit is able to flex upwardly.
Figure 8:
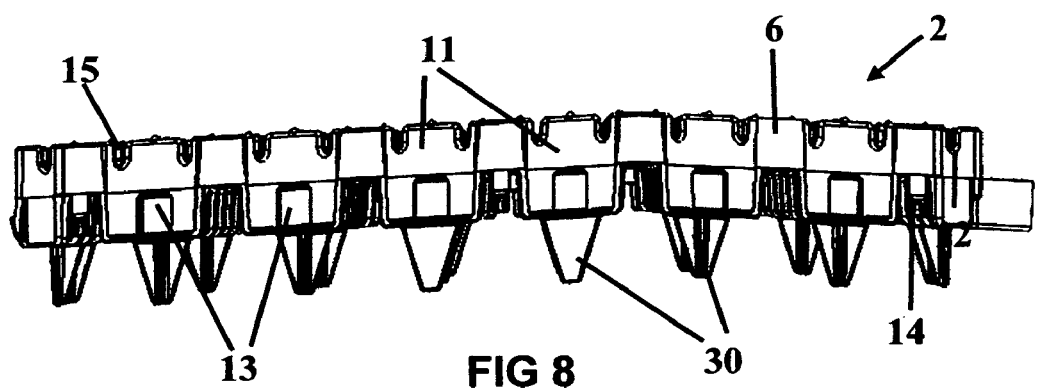
FIG. 8 is a front elevation like FIG. 7 but shows how the modular unit is able to flex downwardly.
Figure 9:
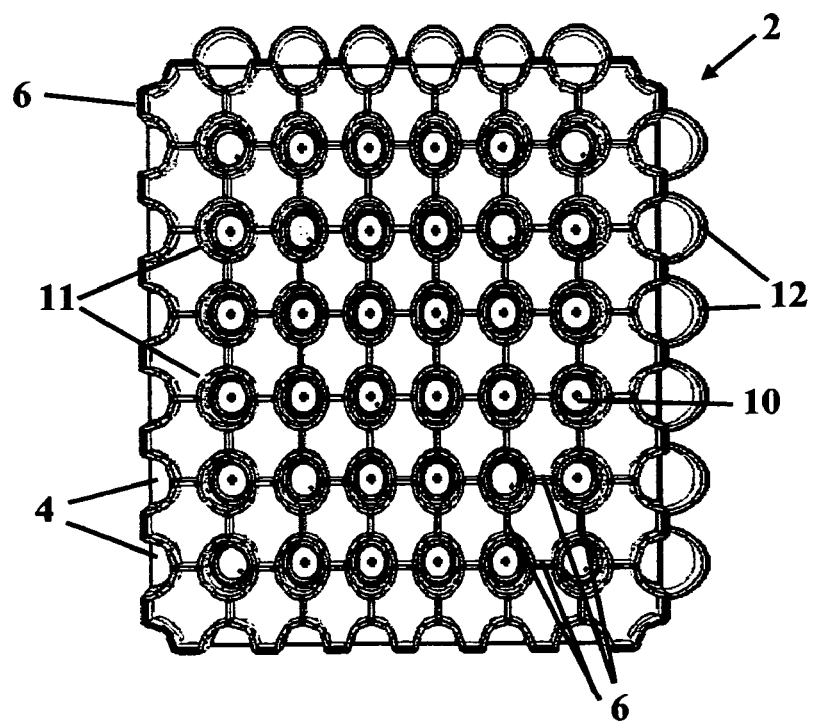
FIG. 9 is a plan view illustrating how round/split cells and rigid walls allow individual cells to flex, expand and contract without fracture or displacement.

FIG. 7 is a front elevation showing how a modular unit 2 is able to flex upwardly. FIG. 8 is a front elevation showing how a modular unit 2 is able to flex downwardly. FIGS. 7, 8 and 9 illustrates how the round/split cells 4 and the rigid walls formed by the rib members 6 allow horizontal and perpendicular flexing. The round/split cells 4 and the rib members 6 not only allow the flexing, but also expansion and contraction, and without fracture or displacement.

The ground-reinforcing grid is such that when it is installed, the modular units 2 are able to flex slightly to accommodate problems caused by the ground, for example with the ground being uneven, or too soft, or suffering from soil subsidence. Nevertheless, the modular units 2 are not so flexible that they are not able to afford a good ground-reinforcing facility. This is because the limited flexing that is required is provided by flexing of the cells 4, and the rib members 6 are designed not to provide the flexing. The rib members 6 are designed to provide the rigidity required of the modular units 2. The ground-reinforcing grid is able to respond to localised deformation, differential settlement and ground heave without separation or fracturing of the interconnected modular units 2. In addition, the modular units 2 are able to expand and contract within their own footprint without fracture or deformation. This enables the modular units 2 to accommodate extremes of plus and minus temperatures which may be encountered during use of the modular units 2.

It is to be appreciated that the embodiment of the invention described above with reference to the accompanying drawings has been given by way of example only and that modifications may be effected. Thus, for example, the cells 4 are such that they have tops with castellations 18. The gaps 20 between the castellations provide fixing locations for U-pin connectors. The gaps 20 also provide grip locations for allowing more grass to grow over each cell 4 and thereby bind separate modular units 4 together more securely. The castellations 18 may vary in shape and number to those shown in the drawings. The modular units 2 are preferably injection moulded from a 100% recycled polyethylene copolymer but other materials may be employed. Individual components shown in the drawings are not limited to use in their drawings and they may be used in other drawings and in all aspects of the invention.

The invention claimed is:

1. A ground-reinforcing grid, comprising a plurality of modular units, wherein each modular unit comprises:
   a plurality of cells,
   rib members connecting the cells together such that the cells are spaced apart from each other by the rib members, and
   connector means for connecting the modular units together,
   wherein the cells are configured to flex more than the rib members;
   wherein each modular unit has sufficient rigidity to enable the ground-reinforcing grid to provide ground reinforcement, and
   wherein each modular unit has sufficient flexibility provided by the flexing of the plurality of the cells to enable the ground-reinforcing grid to flex and accommodate loads without-adversely affecting the rigidity of the ground-reinforcing grid.

2. The ground-reinforcing grid according to claim 1, wherein the cells inside the peripheral cells in each modular unit have four rib members.

3. The ground-reinforcing grid according to claim 2, wherein the four rib members are equidistantly spaced around each cell.

4. The ground-reinforcing grid according to claim 1, wherein the cells are circular in plan.

5. The ground-reinforcing grid according to claim 1, wherein the rib members are walls extending transversely of the ground-reinforcing grid.

6. The ground-reinforcing grid according to claim 1, wherein the cells include open-walled container portions.

7. The ground-reinforcing grid according to claim 6, wherein the container portions are configured to extend across a portion of a bottom side of the cells to aid water retention in the cells and wherein the container portions have at least one aperture for draining away excess water.

8. The ground-reinforcing grid according to claim 1, wherein the connector means comprises two part-cells that fit together vertically to make a complete cell.

9. The ground-reinforcing grid according to claim 8, wherein each part-cell is one half of a complete cell.

10. The ground-reinforcing grid according to claim 9, wherein at least one part-cell forms a full D-loop to facilitate reduced lateral movement.

11. The ground-reinforcing grid according to claim 8, wherein the connector means also comprises auxiliary retention means configured to retain the modular units together when they are subjected to vertical loads.

12. The ground-reinforcing grid according to claim 11, wherein the auxiliary retention means are snap-fit clips that clip adjacent walls of the cells together.

13. The ground-reinforcing grid according to claim 1, further comprising integral ground-engaging spikes.

14. The ground-reinforcing grid according to claim 13, wherein the ground-reinforcing grid is 85 mm in thickness, with the cells being 50 mm deep and the spikes being 35 mm long.

15. The ground-reinforcing grid according to claim 1, wherein each modular unit is 500 mm by 500 mm.

16. The ground-reinforcing grid according to claim 1, wherein each modular unit comprises six by six rows of full cells and two half-cells in each row of six full cells, the two half-cells forming part of the connector means.

17. The ground-reinforcing grid according to claim 1, wherein the cells have tops with castellations.

18. The ground-reinforcing grid according to claim 1, wherein the modular units are configured to overlap each other by at least one cell in any direction.

19. The ground-reinforcing grid according to claim 1, wherein the ground-reinforcing grid is made of a polyethylene copolymer, a polypropylene copolymer, or mixtures thereof.

* * * * *